US005672224A

United States Patent [19]
Kaufmann

[11] Patent Number: 5,672,224
[45] Date of Patent: Sep. 30, 1997

[54] PEEL-BACK RE-SEALABLE MULTI-PLY LABEL

[75] Inventor: Thomas R. Kaufmann, Birchrunville, Pa.

[73] Assignee: Beckett Corporation, Lionville, Pa.

[21] Appl. No.: 495,267

[22] Filed: Jun. 27, 1995

Related U.S. Application Data

[63] Continuation of Ser. No. 260,226, Jun. 14, 1994, abandoned, which is a continuation-in-part of Ser. No. 156,574, Nov. 19, 1993, Pat. No. 5,389,415, which is a continuation of Ser. No. 961,864, Oct. 15, 1992, Pat. No. 5,264,265.

[51] Int. Cl.$^6$ .................................................. B32B 31/00

[52] U.S. Cl. ....................... 156/257; 156/197; 156/216; 156/262; 156/268; 156/263; 156/395

[58] Field of Search .................................. 428/175, 195; 156/277, 289, 291, 324, 324.4, 325, 395, 197, 216, 262, 268, 257, 263

[56] References Cited

U.S. PATENT DOCUMENTS

| | | | |
|---|---|---|---|
| 4,613,046 | 9/1986 | Kuchenbecker | 206/622 |
| 4,858,780 | 8/1989 | Odaka et al. | 220/359 |
| 5,129,517 | 7/1992 | Hustad | 206/467 |
| 5,149,587 | 9/1992 | Hill et al. | 428/354 |
| 5,161,687 | 11/1992 | Kornell et al. | 206/447 |
| 5,225,022 | 7/1993 | Baker et al. | 156/277 |

*Primary Examiner*—Merrick Dixon
*Attorney, Agent, or Firm*—Ostrolenk, Faber, Gerb & Soffen, LLP

[57] ABSTRACT

A multi-ply, re-sealable label intended for retail use to provide extended text and graphics for consumer information. The label construction includes multiple plies of flexible printed materials using bonding agents and release coatings which allow for numerous openings and re-closures. The label incorporates a consumer-friendly peel-tab for easy opening and re-closure, and materials with a natural "memory" to facilitate re-closure and re-sealability without the use of a tacky adhesive.

17 Claims, 2 Drawing Sheets

PEEL-BACK RE-SEALABLE MULTI-PLY LABEL

This is a continuation of application Ser. No. 08/260,226 filed on Jun. 14, 1994, now abandoned, which is a continuation-in-part of application Ser. No. 08/156,574, filed Nov. 19, 1993, now U.S. Pat. No. 5,389,415, which is a continuation of application Ser. No. 07/961,864, filed Oct. 15, 1992, now U.S. Pat. No. 5,264,265.

BACKGROUND OF THE INVENTION

1. Field of the Invention

The present invention relates to labels to be attached, typically by a pressure sensitive adhesive, to packages and containers such as cans, bottles, jars, boxes, etc. More specifically, the invention relates to multi-ply labels, capable of multiple openings and re-closures, for providing extended text and graphics that may be viewed by the consumer, while minimizing adverse impact on the manufacturer's package or container design.

2. Description of the Related Art

Recently, packages and containers have utilized multi-ply and/or folded multi-panel, re-sealable labels as secondary elements of the container. See, e.g., U.S. Pat. Nos. 1,896,834, 1,924,909, and 2,127,081 to Brown, U.S. Pat. No. 4,323,608 to Denny et al, U.S. Pat. No. 4,529,229 to Glibbery, U.S. Pat. No. 4,534,582 to Howard, U.S. Pat. Nos. 4,592,572, 4,711,686, 4,726,972, 4,744,161, 4,744,161, 4,744,591, and 4,830,406 to Instance, U.S. Pat. Nos. 4,621,442 and 4,621,837 to Mack, U.S. Pat. No. 4,889,234 to Sorensen et al., U.S. Pat. No. 5,021,273 to Kobayashi, and U.S. Pat. No. 5,074,595 to Hill et al.

The inventions disclosed in the above patents address the informational needs of the manufacturer without regard to certain consumer sensitivities and/or regulatory concerns. Specifically, all of the inventions referenced in the above patents that offer re-closure rely on a tacky pressure sensitive adhesive for re-sealability. This construction: (a) requires that the consumer actively re-fold and apply pressure to re-seal the label; and (b) allows the possibility of contamination of the tacky adhesive with dirt, oil, etc. from the consumer's skin. Additionally, many of the above inventions involve, as an opening mechanism, the tearing of a perforation, which is not considered consumer-friendly or cosmetically desirable by manufacturers.

SUMMARY OF THE INVENTION

It is therefore an object of the present invention to provide a re-sealable multi-ply label utilizing materials and methods which provide multiple openings and re-closures without the use of a tacky pressure sensitive adhesive for resealability.

Another object of the invention is to provide a consumer-friendly "peel tab" mechanism for easy opening and peel-back of the top ply.

Another object of the invention is to provide a structure that re-closes by design in the event the consumer does not actively re-seal the label.

Another object of the invention is to provide a "hinge", a permanent bond that resists inadvertent removal of the top ply and provides tamper evidence in the event of intentional removal.

The present invention achieves the foregoing objectives by providing a peel-back re-sealable multi-ply label including a bottom ply and a top ply, the top ply being bonded to the bottom ply with permanent adhesive along one edge to form a hinge. A peel tab area is preferably provided on the edge of the label opposite the hinge and includes a tab which extends outwardly from the edge of the top ply, the bottom ply having a notch extending inwardly under the peel-tab area.

At all areas other than at the hinge and the peel-tab, the top ply is releasably bonded to the bottom ply. The releasable bond is preferably formed of a permanent pressure sensitive adhesive, a detackifying layer and a release layer. The detackifying layer is preferably a liquid varnish. The release layer is preferably an ultraviolet curable layer of multi-functional oligomers and acrylates and reactive silicones.

The underside of the bottom ply is preferably coated with a pressure sensitive adhesive for affixing the label to the container. The upper side of the bottom ply is preferably printed with graphics.

The top ply has graphics printed on both its upper and underside, and a protective overvarnish is preferably coated over the graphics on the upper side.

The top ply and bottom ply are preferably a white, opaque flexible olefin film.

The above construction provides a label capable of multiple openings and re-closures without requiring the use of a tacky adhesive for resealability. The novel hinge construction causes the label to reclose automatically if the consumer neglects to actively re-seal the label, and provides tamper evidence if the top ply is intentionally removed. The novel peel tab structure facilitates opening and peel-back of the top ply.

The invention also includes a process for manufacturing the labels in which a notch is die-cut in a bottom ply, and a top ply is bonded to the bottom ply with permanent adhesive along a first edge to form a hinge. The top ply is provided with a peel tab area extending outwardly from a second edge of the top ply opposite the first edge and overlying the notch in the bottom ply. The bottom ply and the top ply are cut together to form the final shape of the label.

Other features and advantages of the present invention will become apparent from the following description of the invention which refers to the accompanying drawings.

DETAILED DESCRIPTION OF THE PREFERRED EMBODIMENT

Figure 1:
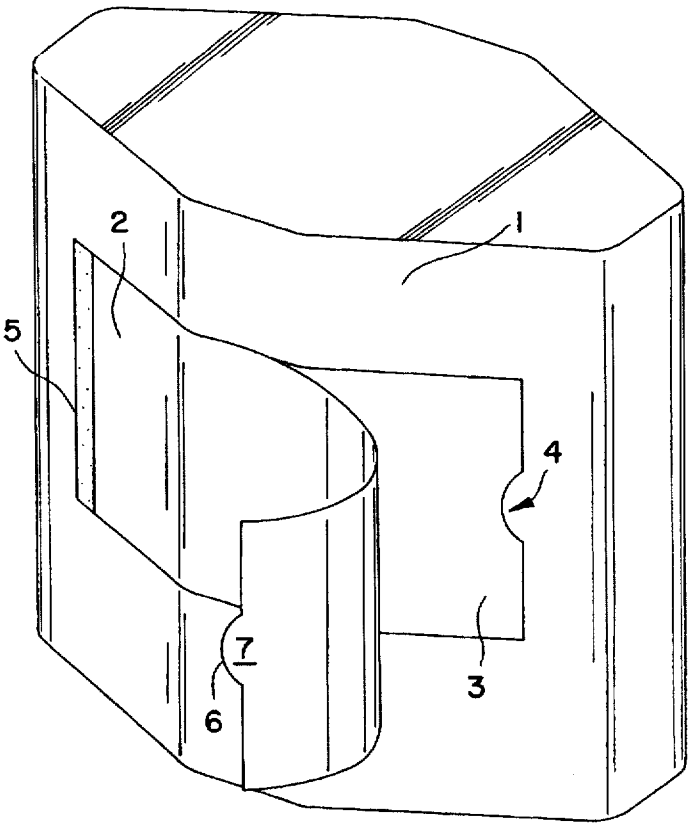
FIG. 1 is a front view which illustrates the invention as it is applied to the surface of the container.

Referring first to FIG. 1, the multi-ply label is shown attached to a container 1. The label includes the top ply 2, adhered with permanent adhesive along edge 5 (the hinge) to the bottom ply. Additionally, the bottom ply 3 has a die-cut notch 4 disposed directly beneath a peel-tab area 7 of the top ply 2. The peel-tab area 7 includes peel tab 6 and functions as a consumer peel-tab. The underside of the bottom ply is affixed to the container, preferably with permanent pressure sensitive adhesive (identified by reference numeral 16 on FIG. 2).

Figure 2:
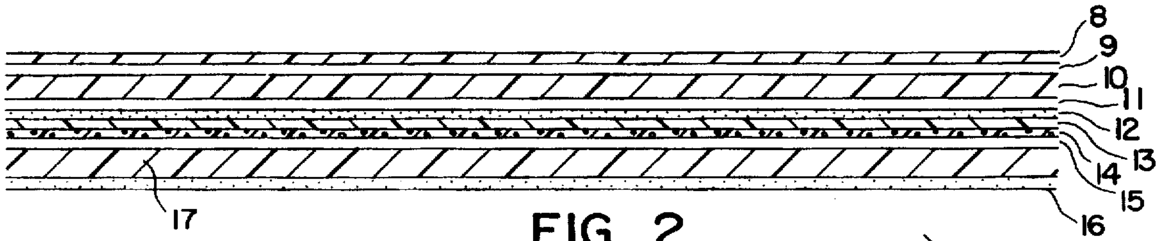
FIG. 2 is an enlarged sectional view of invention in a flat condition.
Figure 3:
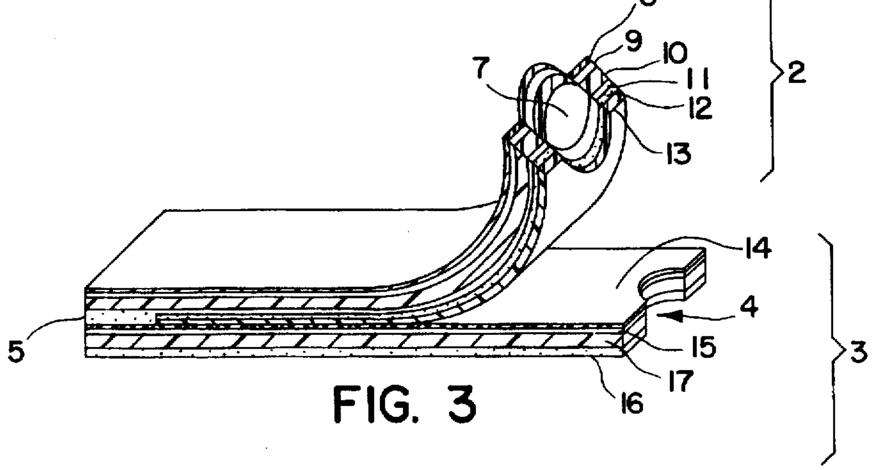
FIG. 3 is an enlarged sectional view of the invention showing the separation of the top and bottom plies.
Figure 4:
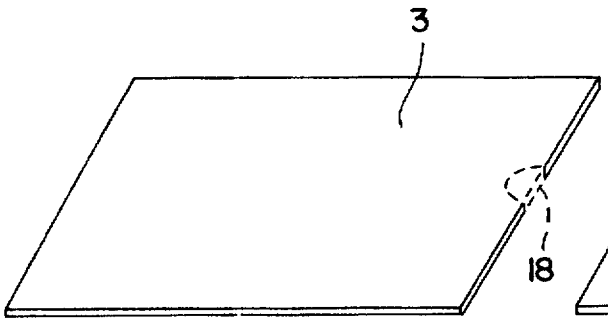
FIG. 4 is a perspective view of a bottom ply layer in a manufacturing step according to a method of the present invention.
Figure 5:
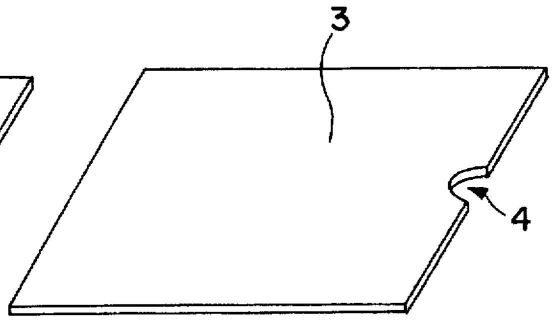
FIG. 5 is a perspective view of a die-cut bottom ply layer in a manufacturing step according to a method of the present invention.
Figure 6:
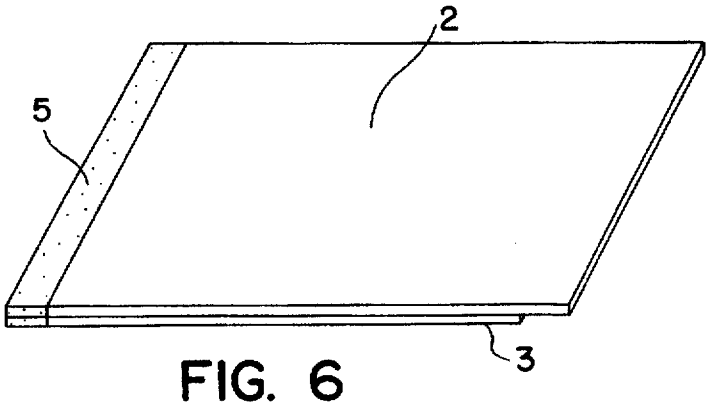
FIG. 6 is a perspective view of a bottom ply layer and a top ply layer adhered at one end to form a hinge in a manufacturing step according to a method of the present invention.
Figure 7:
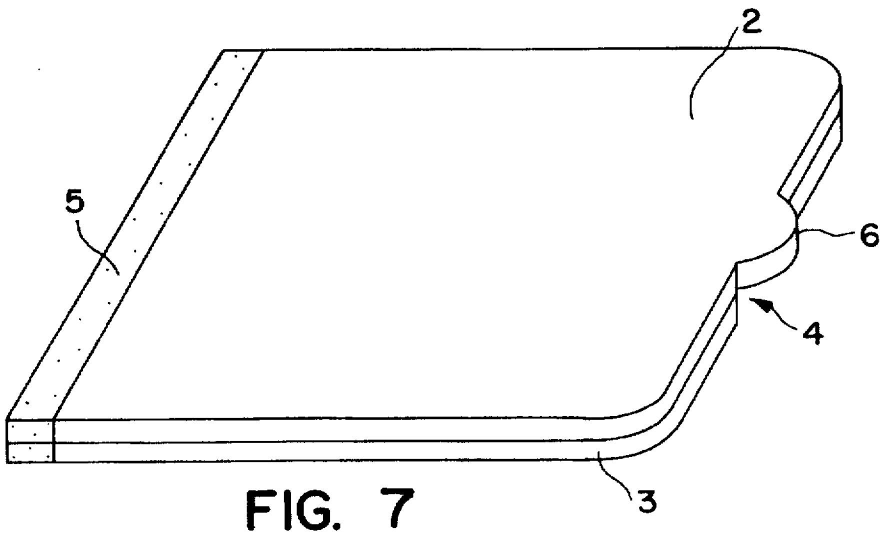
FIG. 7 is a perspective view of a die-cut label in a manufacturing step according to a method of the present invention.

FIGS. 2 and 3 show the invention in greater detail. The top ply consists preferably of a white, opaque, flexible, olefin film 10, with graphics layers 9 and 12 printed on the front and back sides, respectively, and a protective overvarnish 8 applied to the front graphics 9. The film 10 is coated on the underside with a solution acrylic, permanent, pressure sensitive adhesive 11. A portion of that adhesive 11 is coated with a liquid varnish 13 which acts as a detackifying or deadening agent to the adhesive.

The bottom ply consists preferably of a white, opaque, flexible olefin film 17, coated on the underside with a solution acrylic, permanent, pressure sensitive adhesive 16, which is used to affix the label to the container, and is printed on the upper side with a graphics layer 15. An ultraviolet curable layer 14 consisting of multi-functional oligomers and acrylates and reactive silicones provides a dual function of protecting the graphics layer 15 and acting as a releasing and re-sealing layer between the top and bottom plies.

The top ply is bonded permanently to the bottom ply via a portion of the adhesive layer 11 to form a hinge (identified by reference numeral 5 on FIG. 1), and releasably in all other areas. The peel-tab 6 is formed in the top ply. The notch 4 is die cut in the bottom ply directly beneath peel-tab 6.

The film 10 used on the top ply is designed such that, after it is peeled back by the consumer from the bottom ply, it tends to spring back and lay flat on the bottom ply if the consumer neglects to actively re-seal the top ply to the bottom ply.

The de-tackifying layer 13, in combination with the release layer 14, is designed such that resealability during multiple openings and re-closures is achieved without a tacky adhesive, minimizing adhesive contamination and graphic degradation due to contaminants from consumers' handling of the product.

The peel tab 6 is readily grasped by the consumer. Due to the notch in the bottom ply, the peel tab 6 is separated by a small gap from the package surface, causing peel-tab 6 to stand away from the package surface. Adhesive is not applied to the underside of the top ply 2 at the peel-tab area 7.

The nature of the peel-tab is such that the combination of the top and bottom plies provides a consumer-friendly mechanism for peeling back and resealing the top ply.

In the preferred process for manufacturing the present invention, the notch 4 is die cut in the bottom layer and the waste material removed. The top and bottom layers next are laminated together and permanently adhered at one edge to create the hinge, and then the labels are die-cut to the final shape.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for making a peel-back resealable multi-ply label, the multi-ply label having a hinged top ply overlaying a bottom ply for automatic reclosure of the label, the method comprising the steps of:

(a) die-cutting a notch in a bottom ply having an upper side and an underside;

(b) removing waste material from the die-cut notch;

(c) bonding an underside of a flexible, resilient top ply at a first edge to the upper side of the notched bottom ply with permanent adhesive to form a spring hinge, the spring hinge allowing opening of the top ply to expose the upper side of the bottom ply, the spring hinge also providing for automatic reclosure of the top ply over the bottom ply;

(d) cutting the bonded bottom ply and top ply to form a final shape of the label, the top ply having a peel tab extending outwardly from a second edge of the top ply opposite the first edge and a peel tab area overlying the notch in the bottom ply.

2. A method for making a peel-back resealable multi-ply label as recited in claim 1, further comprising the step of:

coating the underside of the bottom ply with a permanent, pressure-sensitive adhesive for affixing the label to a surface.

3. A method for making a peel-back resealable multi-ply label as recited in claim 1, further comprising the step of:

forming a releasable bond between the upper side of the bottom ply and the underside of the top ply in all areas other than at the hinge, at the peel tab, and at the peel tab area.

4. A method for making a peel-back resealable multi-ply label as recited in claim 3, wherein the step of forming a releasable bond between the upper side of the bottom ply and the underside of the top ply comprises the steps of:

applying a permanent, pressure-sensitive adhesive layer to the underside of the top ply;

applying a detackifying layer to the permanent, pressure-sensitive adhesive layer on the underside of the top ply; and applying a releasing layer to the upper side of the bottom ply.

5. A method for making a peel-back re-sealable multi-ply label as recited in claim 4, wherein the step of applying the detackifying layer comprises applying a layer of liquid varnish.

6. A method for making a peel-back resealable multi-ply label as recited in claim 4, wherein the step of applying the releasing layer comprises the step of:

applying an ultraviolet curable layer comprising components selected from the group consisting of multi-functional oligomers and acrylates and reactive silicone.

7. A method for making a peel-back re-sealable multi-ply label as recited in claim 1, further comprising the step of printing graphics on the underside and the upper side of the top ply.

8. A method for making a peel-back re-sealable multi-ply label as recited in claim 7, further comprising the step of printing graphics on the upper side of the bottom ply.

9. A method for making a peel-back resealable multi-ply label, the multi-ply label having a hinged top ply overlaying a bottom ply for automatic reclosure of the label, the method comprising the steps of:

(a) forming a multi-layer bottom ply having an upper side and an underside;

(b) forming a multi-layer top ply including a flexible, resilient film having an upper side and an underside by performing the steps of:

(i) applying a permanent, pressure-sensitive adhesive layer to the underside of the flexible film except for on a peel tab area of the film; and (ii) applying a detackifying layer to the permanent, pressure-sensitive adhesive layer applied to the underside of the top ply except for on at least a hinge portion along a first edge of the flexible film, leaving the permanent, pressure-sensitive adhesive exposed in the hinge portion along the first edge;

(c) forming a spring hinge by permanently adhering the underside of the top ply to the upper side of the bottom ply with the adhesive left exposed on the hinge portion along the first edge of the underside of the top ply, the spring hinge allowing opening of the top ply to expose the upper side of the bottom ply, the spring hinge also providing for automatic reclosure of the top ply over the bottom ply.

10. The method of claim 9, further comprising the steps of:

die-cutting a notch in the bottom ply corresponding to a position below the peel tab area of the top ply; and removing waste material from the die-cut notch.

11. The method of claim 10, wherein the steps of die-cutting a notch and removing waste material are performed prior to the step of forming a hinge.

12. The method of claim 10, further comprising the step of cutting the hinged bottom ply and top ply together to form a final shape of the label.

13. A method for making a peel-back re-sealable multi-ply label as recited in claim 9, further comprising the step of:

coating the underside of the bottom ply with a permanent, pressure-sensitive adhesive for affixing the label to a surface.

14. A method for making a peel-back re-sealable multi-ply label as recited in claim 12, wherein the step of applying a detackifying layer to the permanent, pressure-sensitive adhesive layer applied to the underside of the top ply further comprises leaving the flexible layer exposed on the peel tab area.

15. A method for making a peel-back re-sealable multi-ply label as recited in claim 9, further comprising the step of applying a releasing layer to the upper side of the bottom ply.

16. A method for making a peel-back re-sealable multi-ply label as recited in claim 9, wherein the step of applying the detackifying layer to the permanent, pressure-sensitive adhesive applied to the underside of the top ply comprises applying a layer of liquid varnish.

17. A method for making a peel-back re-sealable multi-ply label as recited in claim 15, wherein the step of applying the releasing layer comprises the step of applying an ultraviolet-curable layer comprising components selected from the group consisting of multi-functional oligomers and acrylates and reactive silicone.

* * * * *